(No Model.)
W. L. CHASE.
METALLIC CASING.
No. 447,807. Patented Mar. 10, 1891.
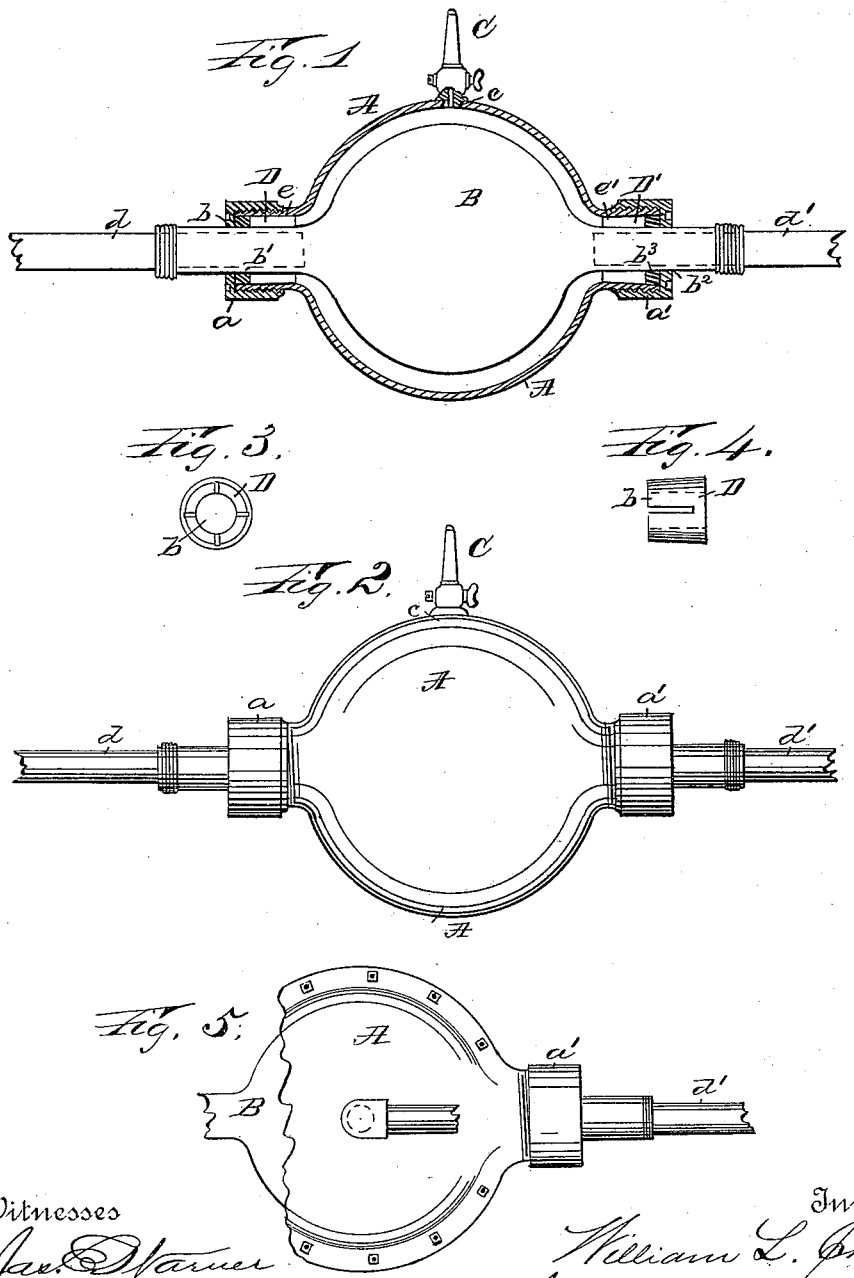
Witnesses
Jas. D. Warner
James M. Hicks
Inventor
William L. Chase
By his Attorney
W. L. Bennem

UNITED STATES PATENT OFFICE.

WILLIAM L. CHASE, OF NEW YORK, N. Y.

METALLIC CASING.

SPECIFICATION forming part of Letters Patent No. 447,807, dated March 10, 1891.

Application filed April 9, 1890. Serial No. 347,180. (No model.)

*To all whom it may concern:*

Be it known that I, WILLIAM L. CHASE, a citizen of the United States, residing in the city, county, and State of New York, have invented a new and useful Metallic Casing; and I do hereby declare that the following is a full, clear, and exact description of the same, reference being had to the accompanying drawings, making part thereof.

My invention relates to gas-engines in which a rubber bag is used to supply gas to the engine. This rubber bag is placed in a metallic casing, so as to prevent the obnoxious vapors caused by leakage from the rubber bag from permeating the room, and also prevents any accident from the bag bursting or fire coming in contact with it; and it consists in certain mechanism fully hereinafter specified and claimed.

In order that persons skilled in the art may understand, construct, and use my invention, I will proceed to describe it, referring to the drawings, in which the same letters indicate like parts in the several figures.

Figure 1 is a longitudinal central section of my metallic casing with the rubber bag in elevation. Fig. 2 is a side elevation of the same. Fig. 3 is a front view of the split plug, and Fig. 4 a side view of the same, and Fig. 5 is a plan view with a part of the outer casing broken away.

A is the metallic casing.

B is the rubber bag.

C is a gas-jet.

D is a split plug.

The metallic casing A may be cast or formed in one or more pieces. This casing A is tapped at $c$ for the reception of a gas-burner C, and it is also constructed with projecting ends, which are threaded for the purpose of receiving the tapped nuts $a\ a'$. It is also provided with tapering holes $e\ e'$ for the tapering plugs D D'. (Shown in Figs. 1, 2, and 3 of the drawings.) These tapering plugs D D' and nuts $a\ a'$ are bored out centrally at $b$, $b'$, $b^2$, and $b^3$, so that the ends of the rubber bag can be passed through them, as well as the gas-pipe $d\ d'$, which fits snugly into the ends of the rubber bag. The tapering plugs D D' are split for the purpose of using them as packing-plugs.

When desired for use, the rubber bag B is rolled up and then passed through the opening in the casing A. The tapering packing-plugs D D' are then slipped over the ends of the rubber bag (which have within them the short piece of iron pipe) and fitted in the tapering recesses in the casing. The tapped nuts $a\ a'$ are then applied to the casing and screwed up until the tapering plug has been forced by means of the nuts to bind itself upon the ends of the rubber bag and the inclosed iron pipe and hold it, thereby preventing any gas escaping from the rubber bag out into the room. I have applied a gas-burner to the metallic casing to burn the gas that has escaped or may escape from the rubber bag, thereby preventing an outward pressure of gas upon the rubber bag when in operation, and thus allow of its free expansion.

The metallic case may be made in two parts with flanges struck up out of thin metal and then bolted together with bolts and nuts, as shown in Fig. 5, or it may be made of glass, and in place of the gas-burner a piece of iron pipe may be used for conducting the obnoxious vapors out of the room.

What I claim as my invention, and desire to secure by Letters Patent, is—

1. In a gas-engine, a metallic casing, in combination with the rubber bag for conducting gas to said engine and secured in said casing by bolts and nuts, and means for removing the obnoxious vapors accumulated in said casing, so as to permit of the free expansion of the rubber bag, substantially as and for the purpose hereinbefore set forth.

2. In a gas-engine, the combination, substantially as hereinbefore set forth, of the metallic casing, the rubber bag, the iron pipes $d\ d'$ for holding the ends of the rubber bag, and the gas-burner C for the purpose of burning the gas from said casing, so as to permit of the free expansion of the rubber bag.

3. The combination, substantially as hereinbefore set forth, of the metallic casing, the rubber bag, the iron pipe, and the split tapering plug for holding the rubber bag in position and to prevent the gas from escaping from said metallic casing.

4. The combination, substantially as hereinbefore set forth, of the metallic casing, the rubber bag, the tapering plug, and the nuts $a\ a'$ for controlling said tapering plug.

WM. L. CHASE.

Witnesses:
JAS. E. WARNER,
JAMES M. HICKS.